US009742735B2

United States Patent
Ignatchenko

(10) Patent No.: US 9,742,735 B2
(45) Date of Patent: Aug. 22, 2017

(54) SECURE ZONE FOR DIGITAL COMMUNICATIONS

(71) Applicant: OLogN Technologies AG, Triesen (LI)

(72) Inventor: Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/861,724

(22) Filed: Apr. 12, 2013

(65) Prior Publication Data

US 2013/0276064 A1 Oct. 17, 2013

Related U.S. Application Data

(60) Provisional application No. 61/623,861, filed on Apr. 13, 2012.

(51) Int. Cl.
| | |
|---|---|
| *H04L 29/06* | (2006.01) |
| *G06F 21/74* | (2013.01) |
| *G06F 21/84* | (2013.01) |
| *G06F 21/44* | (2013.01) |

(Continued)

(52) U.S. Cl.
CPC ............. *H04L 63/04* (2013.01); *G06F 21/44* (2013.01); *G06F 21/53* (2013.01); *G06F 21/57* (2013.01); *G06F 21/74* (2013.01); *G06F 21/84* (2013.01); *G06F 2221/2143* (2013.01)

(58) Field of Classification Search
CPC .......... G06F 21/53; G06F 21/44; G06F 21/57; G06F 21/74; G06F 21/84; G06F 2221/2143; G06F 21/575; G06F 2009/45587; G06F 9/45558; G06F 21/602; G06F 21/51;
(Continued)

(56) References Cited

U.S. PATENT DOCUMENTS

| | | | |
|---|---|---|---|
| 5,134,700 A | 7/1992 | Eyer et al. | |
| 5,500,897 A | 3/1996 | Hartman, Jr. | |
| 5,615,263 A | 3/1997 | Takahashi | |

(Continued)

FOREIGN PATENT DOCUMENTS

| | | |
|---|---|---|
| EP | 1 612 670 A2 | 1/2006 |
| EP | 2 045 753 A1 | 4/2009 |

(Continued)

OTHER PUBLICATIONS

International Search Report for International Application No. PCT/IB2013/000680 dated Sep. 5, 2013.

(Continued)

*Primary Examiner* — Kambiz Zand
*Assistant Examiner* — Abiy Getachew
(74) *Attorney, Agent, or Firm* — Arnold & Porter Kaye Scholer LLP

(57) ABSTRACT

The systems, methods and apparatuses described herein provide a computing environment that includes a secure zone for executing tasks. An apparatus according to the present disclosure may comprise a screen, a secure zone and an indicator operatively controlled by the secure zone. The secure zone may be configured to execute a task and to assume control over an output to the screen while the apparatus is operating in a secure mode and to transfer control over the output to the screen to a non-secure zone while the apparatus is operating in a non-secure mode.

18 Claims, 4 Drawing Sheets

(51) Int. Cl.
*G06F 21/53* (2013.01)
*G06F 21/57* (2013.01)

(58) Field of Classification Search
CPC .......... G06F 21/54; G06F 21/62; G06F 21/83;
G06F 9/468; H04L 63/00; H04L 63/04
USPC .......................................................... 726/3
See application file for complete search history.

(56) References Cited

U.S. PATENT DOCUMENTS

| | | | |
|---|---|---|---|
| 5,677,955 | A | 10/1997 | Doggett et al. |
| 5,787,172 | A | 7/1998 | Arnold |
| 5,815,571 | A | 9/1998 | Finley |
| 5,832,206 | A | 11/1998 | De Jesus et al. |
| 5,896,499 | A | 4/1999 | McKelvey |
| 5,978,484 | A | 11/1999 | Apperson et al. |
| 6,088,684 | A | 7/2000 | Custy et al. |
| 6,091,823 | A | 7/2000 | Hosomi et al. |
| 6,092,202 | A | 7/2000 | Veil et al. |
| 6,163,771 | A | 12/2000 | Walker et al. |
| 6,385,727 | B1 | 5/2002 | Cassagnol et al. |
| 6,581,841 | B1 | 6/2003 | Christoffersen |
| 6,862,641 | B1 | 3/2005 | Strongin et al. |
| 7,065,654 | B1 | 6/2006 | Gulick et al. |
| 7,337,314 | B2 | 2/2008 | Hussain et al. |
| 7,350,194 | B1 | 3/2008 | Alpern |
| 7,363,493 | B2 | 4/2008 | Dotan |
| 7,574,479 | B2 | 8/2009 | Morris et al. |
| 7,587,611 | B2 | 9/2009 | Johnson et al. |
| 7,636,858 | B2 | 12/2009 | Khan et al. |
| 7,681,046 | B1 | 3/2010 | Morgan et al. |
| 7,774,619 | B2 | 8/2010 | Paaske et al. |
| 7,779,252 | B2 | 8/2010 | O'Brien et al. |
| 7,797,544 | B2 | 9/2010 | Dillaway et al. |
| 7,853,531 | B2 | 12/2010 | Lao et al. |
| 7,861,097 | B2 | 12/2010 | Smeets et al. |
| 7,882,221 | B2 | 2/2011 | Sailer et al. |
| 7,940,932 | B2 | 5/2011 | Paksoy et al. |
| 7,979,696 | B2 | 7/2011 | Kim et al. |
| 8,112,787 | B2 | 2/2012 | Buer |
| 8,656,482 | B1 | 2/2014 | Tosa et al. |
| 8,949,929 | B2 | 2/2015 | Kelly et al. |
| 8,959,183 | B2 | 2/2015 | Zeller et al. |
| 9,015,703 | B2 | 4/2015 | Fitzgerald et al. |
| 2002/0062438 | A1 | 5/2002 | Asay et al. |
| 2002/0183056 | A1 | 12/2002 | Lundblade et al. |
| 2003/0051169 | A1 | 3/2003 | Sprigg et al. |
| 2004/0010565 | A1* | 1/2004 | Hong ................... G01C 21/26 709/217 |
| 2005/0005161 | A1 | 1/2005 | Baldwin |
| 2005/0268103 | A1 | 12/2005 | Camenisch |
| 2006/0010447 | A1 | 1/2006 | Egashira et al. |
| 2006/0047959 | A1 | 3/2006 | Morais |
| 2006/0101408 | A1 | 5/2006 | Kotamarthi et al. |
| 2006/0107268 | A1 | 5/2006 | Chrabieh |
| 2006/0117177 | A1 | 6/2006 | Buer |
| 2006/0168663 | A1 | 7/2006 | Viljoen et al. |
| 2006/0259790 | A1 | 11/2006 | Asokan et al. |
| 2007/0226807 | A1 | 9/2007 | Ginter et al. |
| 2008/0155540 | A1 | 6/2008 | Mock et al. |
| 2008/0208758 | A1 | 8/2008 | Spiker et al. |
| 2008/0270786 | A1 | 10/2008 | Brickell et al. |
| 2008/0306876 | A1 | 12/2008 | Horvath et al. |
| 2008/0316357 | A1 | 12/2008 | Achari et al. |
| 2009/0072032 | A1 | 3/2009 | Cardone et al. |
| 2009/0172329 | A1 | 7/2009 | Paver et al. |
| 2009/0172411 | A1 | 7/2009 | Kershaw et al. |
| 2009/0210705 | A1 | 8/2009 | Chen |
| 2009/0254986 | A1 | 10/2009 | Harris et al. |
| 2009/0271618 | A1 | 10/2009 | Camenisch et al. |
| 2009/0300263 | A1 | 12/2009 | Devine et al. |
| 2009/0300348 | A1 | 12/2009 | Aciicmez et al. |
| 2009/0313468 | A1 | 12/2009 | Hazlewood et al. |
| 2009/0320048 | A1* | 12/2009 | Watt ..................... G06F 9/526 719/319 |
| 2010/0031047 | A1 | 2/2010 | Coker, II et al. |
| 2010/0145854 | A1 | 6/2010 | Messerges et al. |
| 2010/0192230 | A1* | 7/2010 | Steeves ................ H04L 63/08 726/26 |
| 2010/0269179 | A1 | 10/2010 | Fahrny |
| 2010/0293099 | A1 | 11/2010 | Pauker et al. |
| 2011/0029771 | A1 | 2/2011 | Mehta et al. |
| 2011/0087887 | A1 | 4/2011 | Luft et al. |
| 2012/0072346 | A1 | 3/2012 | Barkan Daynovsky et al. |
| 2012/0137117 | A1 | 5/2012 | Bosch et al. |
| 2012/0240194 | A1 | 9/2012 | Nack Ngue |
| 2013/0055347 | A1 | 2/2013 | Chawla et al. |
| 2013/0124415 | A1 | 5/2013 | Mardikar |
| 2013/0232339 | A1 | 9/2013 | Ignatchenko et al. |
| 2013/0238786 | A1 | 9/2013 | Khesin |
| 2013/0262891 | A1 | 10/2013 | Gudlavenkatasiva et al. |
| 2013/0275306 | A1 | 10/2013 | Ignatchenko et al. |
| 2013/0276064 | A1 | 10/2013 | Ignatchenko et al. |
| 2013/0283353 | A1 | 10/2013 | Ignatchenko et al. |
| 2013/0339742 | A1 | 12/2013 | Ignatchenko et al. |
| 2013/0346747 | A1 | 12/2013 | Ignatchenko et al. |
| 2013/0346760 | A1 | 12/2013 | Ignatchenko |
| 2014/0096182 | A1 | 4/2014 | Smith |
| 2014/0143538 | A1 | 5/2014 | Lindteigen |
| 2014/0196127 | A1 | 7/2014 | Smeets et al. |
| 2014/0279562 | A1 | 9/2014 | Ignatchenko et al. |
| 2014/0281500 | A1 | 9/2014 | Ignatchenko |
| 2014/0281560 | A1 | 9/2014 | Ignatchenko et al. |
| 2014/0281587 | A1 | 9/2014 | Ignatchenko |
| 2014/0282543 | A1 | 9/2014 | Ignatchenko et al. |
| 2015/0089244 | A1 | 3/2015 | Roth et al. |

FOREIGN PATENT DOCUMENTS

| | | |
|---|---|---|
| EP | 2 107 486 A2 | 10/2009 |
| EP | 2 113 855 A1 | 11/2009 |
| EP | 2 278 514 A1 | 1/2011 |
| WO | 01/17296 A1 | 3/2001 |
| WO | 2009/071734 A1 | 6/2009 |
| WO | 2009/111409 A1 | 9/2009 |
| WO | 2011/037665 A2 | 3/2011 |
| WO | 2012/014231 A1 | 2/2012 |

OTHER PUBLICATIONS

Written Opinion for International Application No. PCT/IB2013/000680 dated Sep. 5, 2013.
Anonymous, TrustZone System Security by ARM The Architecture for the Digital World, retrieved from the Internet at http://www.arm.com/products/processors/technologies/trustzone/index.php (2014).
Alsouri et al., "Group-Based Attestation: Enhancing Privacy and Management in Remote Attestation," *Trust and Trustworthy Computing*, 63-77 (Jun. 2010).
Anderson et al. "Cryptographic Processors—a survey", *Technical Report*, No. 641, University of Cambridge Computer Laboratory (Aug. 2005) (http://www.cl.cam.ac.uk/techreports/UCAM-CL-TR-641.pdf).
Chen et al., "A New Direct Anonymous Attestation Scheme from Bilinear Maps," 2008. ICYCS 2008. *The 9th International Conference for Young Computer Scientists*, 2308-2313 (2008).
Garfinkel, "Terra: a virtual machine-based platform for trusted computer," *ACM SOSP. Proceedings of the ACM Symposium on Operating Systems Principles*, 193-206 (2003).
Guo et al., "A New DAA Scheme From One-off Public Key," *Electronics, Communications and Control (ICECC), 2011 International Conference*, 646-649 (Sep. 2011).
International Search Report and Written Opinion issued in PCT/IB2013/000672, dated Jul. 23, 2013.
International Search Report issued in PCT/IB2013/000741 on Dec. 12, 2013.
International Search Report and Written Opinion issued in PCT/IB2014/059638 on Jul. 3, 2014.

(56) References Cited

OTHER PUBLICATIONS

International Search Report and Written Opinion issued in PCT/IB2014/059839 on Aug. 7, 2014.
International Search Report and Written Opinion issued in PCT/IB2014/059845 on Aug. 8, 2014.
Manulis et al., "UPBA: User-Authenticated Property-Based Attestation," *Privacy, Security and Trust (PST), 2011 Ninth Annual International Conference*, 112-119 (2011).
Suh et al., "AEGIS: Architecture for Tamper-Evident and Tamper-Resistant Processing," Computation Structures Group Memo 461, CSAIL Computer Science and Artificial Intelligence Laboratory, Massachusetts Institute of Technology (Feb. 2003).
Sun et al., "A Strict Inter-Domain Anonymity Attestation Scheme," *Computer Design and Applications (ICCDA), 2010 International Conference*, V3-291-V3-295 (2010).
Tanveer et al., "Scalable Remote Attestation with Privacy Protection (Work in Progress)," *Trusted Systems*, 73-87 (Dec. 2009).
Yu et al., "An anonymous property-based attestation protocol from bilinear maps," *Computational Science and Engineering, 2009. CSE '09, International Conference*, 2:732-738 (2009).
Yu et al., "Real-Time Remote Attestation with Privacy Protection," *Trust Privacy and Security in Digital Business*, 81-92 (Aug. 2010).
Zhang et al., "Improving Privacy of Property-based Attestation without a Trusted Third Party," *Computational Intelligence and Security (CIS), 2011 Seventh International Conference on Computational Intelligence and Security*, 559-563 (2011).
Bare, "Attestation and Trusted Computing," CSEP 590: Practical Aspects of Modern Cryptography, 1-9 (2006).
Berger et al., "vTPM: Virtualizing the Trusted Platform Module," Security '06: 15th USENIX Security Symposium, *USENIX Association*, pp. 305-320 (2006).
Stumpf et al. , "Improving the Scalability of Platform Attestation," Proceedings of the $3^{rd}$ ACM workshop on Scalable trusted computing, *ACM* , pp. 1-10 (2008).
International Search Report and Written Opinion issued in PCT/IB2014/063637 on Nov. 18, 2014.

* cited by examiner

SECURE ZONE FOR DIGITAL COMMUNICATIONS

RELATED APPLICATIONS

This application claims priority to U.S. Provisional Application No. 61/623,861, filed Apr. 13, 2012, entitled "Secure Zone for Digital Communications," the content of which is incorporated herein by reference in its entirety.

FIELD OF THE DISCLOSURE

The systems, methods and apparatuses described herein relate to the security of computer network-based commercial and other sensitive data transactions.

BACKGROUND

Internet shopping, online banking, and other network-based forms of transmitting sensitive data are highly popular, but may be susceptible to a variety of security breaches resulting from computer viruses, backdoors, keyloggers and other forms of attacks on the user's computer or other device. These attacks generally relate to vulnerabilities in the operating system of the device used to access the network. What is needed is a suitable hardware platform to implement security solutions which are not susceptible to software-based attacks.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for securely performing computer-based actions or transactions. For example, it might be desirable to use a computer to establish a secure connection with another user, for example, as a secure text-based chat session, or a secure phone call. In another example, it might be desirable for an appropriately-equipped television to receive encrypted media content from an Internet store. In each case, a skilled individual could intercept the data within an operating system running the computer—e.g., even if a chat conversation is encrypted before it is transmitted from one computer to another, each text message could be intercepted within the operating system 111 before it enters the encrypted channel, or a movie transferred from the Internet store could be intercepted after it is decrypted—by, for example, installing malware (such as a virus, a keylogger or a Trojan horse) into the operating system of the user's computer. The inventions described herein provide a way to transfer certain activities to a secure zone, which cannot be compromised even if the operating system is under complete control of the attacker, so as to ensure that these computer-based activities truly remain secure from attack. In addition, for additional security, the secure zone may be made tamper-resistant and/or may use tamper detection techniques, with, for example, erasure of one or more cryptographic keys upon tamper detection.

Figure 1:
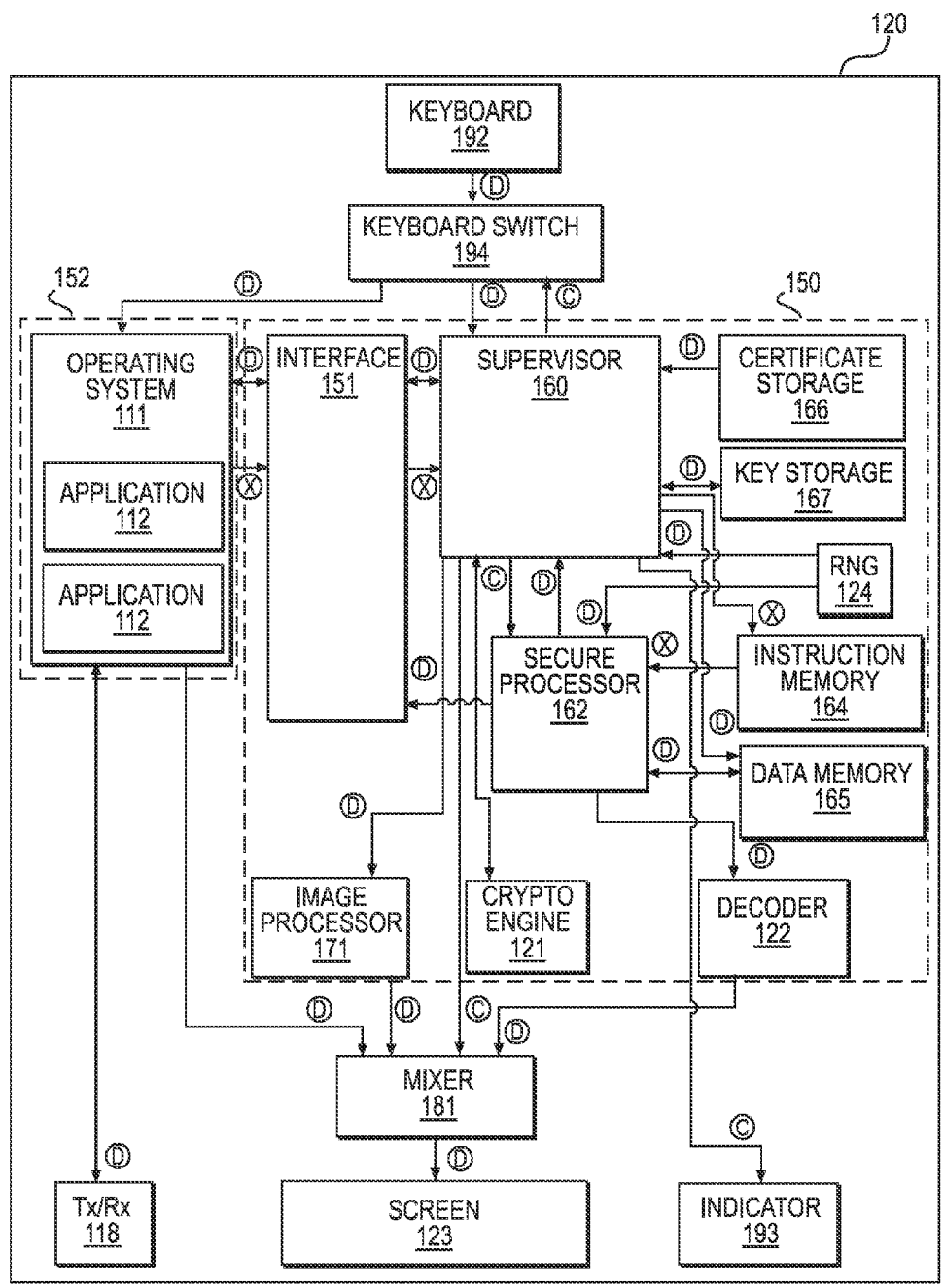
FIG. 1 is a block diagram of an exemplary system according to the present disclosure.

FIG. 1 shows one example by which a secure zone 150 according to the present disclosure may be implemented in a larger device 120, such as a computer, laptop, smart phone, television set, personal music player, set-top box, etc.

A secure zone 150 according to the present disclosure may first comprise an interface 151 to one or more non-secure zones 152. The term "non-secure zone," as used herein, refers to any device, processor, operating system, or other object, or combination thereof, which is capable of providing messages, codes, tasks or other information to a secure zone 150. The interface 151 may be configured to receive these messages, codes or tasks from those non-secure zones 152. For example, if a secure zone 150 is implemented in a laptop, the interface 151 may be implemented as some kind of bus (for example, a PCIe bus) and may be configured to receive messages, code, tasks or other information from the laptop's central processing unit. If the secure zone 150 were implemented in a television, the interface 151 again might be implemented, for example, as some kind of bus (for example, an I²C bus), and configured to receive information from a separate set-top box or from the microcontroller unit of the television.

A secure zone 150 may further comprise a supervisor 160 coupled to the interface 151. The supervisor 160 may be used to control access to the components of the secure zone 150, and may be used to enforce certain operational rules of the secure zone 150, providing certain security guarantees to the end-user. For example, in one embodiment, the supervisor 160 may be able to: (1) receive executable code which can be run on one or more secure processors 162 within the secure zone 150 via the interface 151; (2) check that certain requirements (as described in greater detail below) are fulfilled for this code; (3) if requirements are fulfilled, load this code into one or more instruction memories 164 located within the secure zone 150; (4) clear one or more data memories 165 located within the secure zone 150; (5) instruct the secure processor 162 to execute code loaded into the instruction memory 164; (6) control one or more indicators 193, which may be used to signal to a user that the secure zone 150 has assumed control of the computing device 120; (7) control one or more peripherals within the computing device 120; (8) provide visual feedback to the end-user about the origin of the loaded code and (9) clean up (to the extent required) after the code has been executed. Each of these functions are described in greater detail below. In one embodiment, the supervisor 160 may be implemented in hardware within the secure zone 151, such that the supervisor 160 cannot be affected or modified.

As noted previously, the secure zone 150 also may comprise a secure processor 162, which may be configured to execute code loaded into the instruction memory 164 and to exchange data with the interface 151. The secure processor 162 may be a general purpose processor or any suitable form of special purpose processor. In some embodiments, the secure processor 162 may be implemented as a hardware separate from the supervisor 160; in some other embodiments, the supervisor 160 and the secure processor 162 could be implemented using the same hardware, as long as the functional requirements specified below are observed. In addition, it will be understood that while FIG. 1 shows the secure processor 162 as having a so-called "Harvard architecture" (with separate instruction memory 164 and data memory 165), other architectures (like the ubiquitous von Neumann architecture) may be used as long as equivalent instruction and data restrictions are enforced by the supervisor 160 (for example, the XN bit may be used in ARM® processors to provide some separation of data memory from instruction memory, as long as the XN bit in appropriate memory areas is enforced by the supervisor 160 and cannot be altered by loadable code running on the secure processor 162).

In certain embodiments, the secure zone 150 may further comprise one or more cryptographic engines 121. These cryptographic engines 121 may be configured to implement one or more cryptographic algorithms, such as AES or RSA. The cryptographic engine 121 may receive data from the supervisor 160 for encryption or decryption, and may provide the resulting ciphertext (or plaintext, as appropriate) back to the supervisor 160. In some embodiments, the cryptographic engine 121 also may be used by the secure processor 162; in this case, it may be desirable to have a clear separation between any cryptography-related tasks coming from the supervisor 160 to the crypto engine 121 and any cryptography-related tasks coming from the secure processor 162 to the crypto engine 121, so as to avoid any leaks of information associated with one component to the other. The secure zone 150 may also comprise a random number generator 124 to provide support to cryptographic processes.

In other embodiments, the supervisor 160 may be configured to perform some or all of the functionality of the cryptographic engine 121, and a separate cryptographic engine 121 may not be required.

If the secure zone 150 is expected to perform image and/or video processing, it may further comprise a decoder 122. For example, if the secure zone 150 receives encrypted media content from the non-secure zone 152 (such as from a video player application 112 running within the operating system 111), the code running on secure processor 162 (with or without the help of the cryptographic engine 121, depending on the embodiment) might be responsible for decrypting the content, and then the decoder 122 may be responsible for decoding the content. This decoder 122 may comprise, for example, implementations of algorithms such as H.264, VC-1, PNG, JPEG, etc. In some cases, the decoder 122 may also include certain text rendering capabilities.

In some embodiments, the decoder 122 may be implemented in hardware (for example, as a specialized DSP processor). As shown on FIG. 1, the decoder 122 may be coupled to the secure processor 162, such that decrypted data may pass from the cryptographic engine 121 to the decoder 122.

In some other embodiments, the secure processor 162 may be configured to perform some or all of the functionality of the decoder 122, and a separate decoder may not be required. In still other embodiments, the secure zone 150 may not provide native support for image and/or video decoding, but may be able to receive and execute code (on the secure processor 162) designed to implement this type of media content processing.

As noted previously, the secure zone 150 may further comprise one or more instruction memories 164 and data memories 165, which may be implemented as volatile memory. The absence of persistent writable storage for executable code may ensure that no viruses, back-doors, or other malicious code can be installed within the secure zone 150. In addition, the secure zone 150 may contain one or more dedicated certificate storages 166, which may be implemented as read-only non-volatile memory, and one or more dedicated key storages 167, which may be implemented as non-volatile memory. Key storage 167 may be used, for example, for the storage of one or more private keys (which can be generated, for example, by supervisor 160 using RNG 124), one or more corresponding public key(s) or associated digital certificates, and/or a unique device identifier. This information may be used to identify and/or authenticate the computer-based device 120 within which the secure zone 150 is located.

As noted previously, a secure zone 150 is meant to be used within the context of a larger computer-based device 120, such as a television or a laptop. Thus, it will be understood that the computer-based device 120 may comprise a number of components which are outside the secure zone 150, but may nonetheless assist in the operation of the secure zone 150. For example, the device 120 may comprise traditional input/output devices such as a keyboard 192 or a screen 123; in other embodiments, the device 120 may further comprise other I/O devices (such as a mouse, remote control transceivers, speakers, or cameras). These I/O devices may be beneficial to the operation of the secure zone 150 when, for example, a user desires to type a secure text message without the risk of the operating system 111 eavesdropping or modifying it. The device 120 may further comprise a communications port 118, enabling the device to communicate with other devices. In the foregoing example, the communications port 118 may be useful in creating a connection between the device 120 and a remote computer over a network connection. Also, such a computer-based device 120 may run an operating system 111 and one or more applications 112.

Finally, as shown on FIG. 1, the device 120 also may comprise a means for indicating when the device 120 is operating in secure mode, shown on FIG. 1 as "indicator" 193. Such an indicator 193 may be, for example, a green LED which is placed on an outside case of the device 120 and readily visible to a user.

As a result, a device 120 according to the present disclosure may further comprise additional hardware allowing it to take control of these peripheral components of the device 120 from, e.g., the operating system 111. For example, the secure device 120 may comprise a mixer 181, allowing the secure zone 150 to control the screen 123. The device 120 might also comprise a keyboard switch 194, allowing the secure zone 150 to control the keyboard 192. In this manner, the same input/output devices (e.g., the keyboard 192 and screen 123) may be used to support both non-secure and secure zones. It shall be understood that while FIG. 1 shows components like the mixer 181 and the keyboard switch 194 as implemented outside of the secure zone 150, in some embodiments these components may be placed within the secure zone 150.

Finally, the secure zone 150 may be physically secured, such that it is tamper-resistant. The secure zone 150 may also (alternatively, or in addition to being tamper-resistant) incorporate one or more tamper detection techniques. For example, several tamper-resistant methods for protecting cryptographic processors are already known and have been described in the art (see, for example, http://www.cl.cam.ac.uk/techreports/UCAM-CL-TR-641.pdf). In some embodiments, it may be desirable, for instance, to manufacture the secure zone 150 within a single chip. In another embodiment, the secure zone 150 might have a secure enclosure. In some of these embodiments, the secure zone 150 may be configured to execute one or more possible responses if it detects that the chip's integrity has been compromised, and/or if it detects penetration of the secure enclosure. These responses may vary from erasing any stored encryption key(s) within the key storage 167 to the physical destruction of all or part of the secure zone 150.

Figure 2:
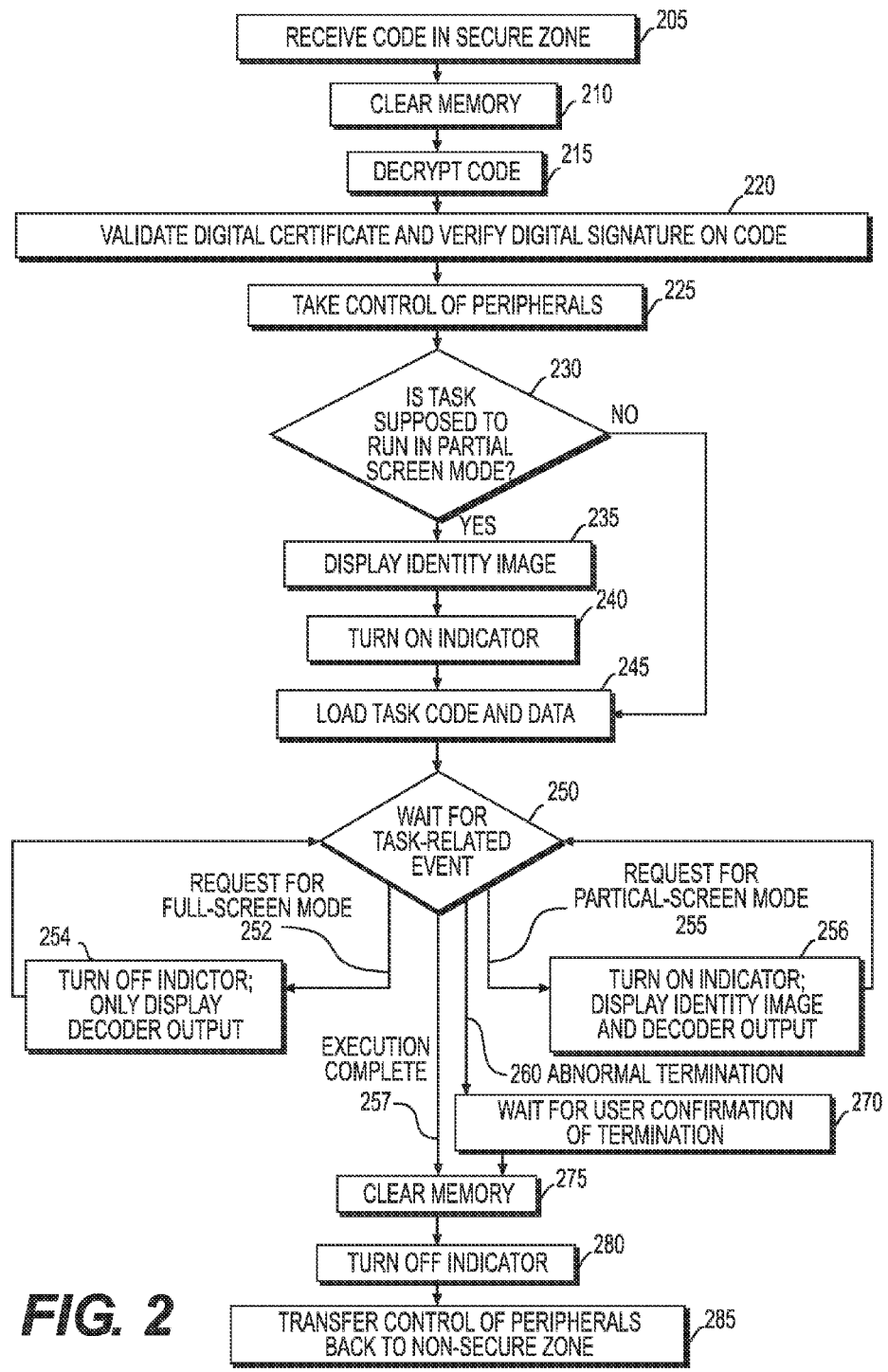
FIG. 2 is a flow diagram illustrating an exemplary method by which a system according to the current disclosure may accept a task for execution; organize the process of task execution; and cleanup after task execution.

FIG. 2 shows an exemplary method by which a secure zone 150 according to the present disclosure may accept a task for execution; organize the process of task execution; and cleanup after task execution.

At step 205, the interface 151 may receive the code from the non-secure zone 152, and may pass this code to the supervisor 160 for execution by the secure processor 162. It should be understood that whenever code is transferred at step 205, the code may additionally include related application data.

At step 210, prior to executing any received code, the supervisor 160 may clear all data stored within the instruction memory 164 and data memory 165. For example, the supervisor 160 might zero all of the instruction memory 164 and data memory 165. This may be performed to prevent old code, data, or both, from affecting the code currently being loaded, and to avoid information leaks between different pieces of code.

In some embodiments, the code provider may have encrypted the code (and any related application data) before sending it to the secure zone 150. For example, the code provider may have used a public key corresponding to a private key of the supervisor 160 (which may previously have been stored in the key storage 167, and which may be used by the supervisor 160 to decrypt the code) to encrypt the code. Thus, at step 215, if the code has been encrypted using a public key of the supervisor 160, the supervisor 160 may extract a copy of the corresponding private key from key storage 167 and direct the cryptographic engine 121 to decrypt the code (and any associated data, if applicable) using this private key.

In addition, the code (and any related data) also may have been digitally signed using the code provider's private key, guaranteeing the authenticity of the code. To enable validation of the digital signature and the signed code, a digital certificate capable of authenticating the code provider may be provided with the code. For example, the code provider may have a private key and a corresponding digital certificate which has been signed by a "root certificate" of a certificate authority. In such an implementation, the root certificate previously may have been stored in the certificate storage 166. In some embodiments, instead of a single certificate, whole "certificate chains" may be included with the code. In other embodiments, alternative ways of obtaining intermediate certificates (for example, issuing a request to a server (not shown) via the operating system OS 111 and communications port 118) may be used.

At step 220, the supervisor 160 may instruct the cryptographic engine 121 to validate the digital signature of the code provider. This validation of the digital signature will usually include validation of the certificate received with the code. For example, if the code provider's certificate were signed by a certificate authority such as VeriSign®, the supervisor 160 may take a copy of the appropriate VeriSign root certificate from the certificate storage 166 and verify that this root certificate was used to sign the code provider's certificate, performing a typical public key infrastructure (PKI) signature validation; in some cases, a more elaborate validation (for example, including "certificate chains") may be implemented.

In some embodiments, other signature validation schemas (for example, those used in the simple public key infrastructure (SPKI)/simple distributed security infrastructure (SDSI) or the "web of trust" used in pretty good privacy (PGP)) may be used.

In some embodiments, the supervisor 160 may additionally perform certificate revocation list (CRL) validation to ensure that all certificates involved in the signature validation are still valid. CRL can be obtained, for example, by means of a request to a server which hosts CRLs. This request can be made, for example, via the operating system 111 and the communications port 118 of the non-secure zone 152.

In some embodiments, the Online Certificate Status Protocol (OCSP) may be used to check certificate validity (instead of or in addition to CRL validation).

In certain embodiments, the code provider's digital certificate may differ slightly from a traditional certificate, such that it contains not only a text entry capable of identifying the certificate owner (usually the "CN" field of an X.509 digital certificate), indicating the name of the code provider associated with the certificate, but may further contain an image (for example, PNG or JPEG) with a visual representation of the identity of the code provider. This image may be a part of the digital certificate in the sense that it may be covered by the signature of the certificate issuer in the same way that the other fields of the certificate should be covered; for example, in an X.509 certificate such an "identity image" may be included as an extension in the "Extensions" field. As will be described in further detail below, in some embodiments, it may also be desirable to show this "identity image" on a predesignated portion of the screen 123 while the code is executed.

At step 225, the supervisor 160 may take control of one or more peripherals of the computing device 120 that it needs in order to execute the received code. For example, the supervisor 160 may take control of the keyboard 192 and the screen 123 of the laptop. In such a case, the supervisor 160 may instruct the keyboard switch 194 to effectively disconnect the keyboard 192 from the non-secure components (such as the operating system 111) and to route all keyboard input to the secure zone 150. The supervisor 160 may also instruct the mixer 181 to combine output from image processor 171 and decoder 122 to form image on screen 123, effectively disconnecting the non-secure zone from the screen 123.

In some embodiments, it may be desirable to provide one or more affirmative confirmations to the user that the device 120 is now operating in a partial-screen secure mode. Thus, at step 235, the supervisor 160 may provide the "identity image" from the code provider's certificate (which certificate has been validated in step 220) to the image processor 171, and may instruct the mixer 181 to show information from the image processor 171 on a designated area of the screen 123. At step 240, the supervisor 160 may turn on the indicator 193.

In such embodiments, the user may confirm that the task is running in the secure zone 150 by checking that the indicator 193 is on, and may confirm that the task was received from a legitimate code provider by verifying that the information displayed in the designated area of the screen 123 (e.g., the code provider's certificate identity image) corresponds to the user's expectations for this task.

If, for example, the information displayed on the screen 123 does not match the user's expectations—e.g., the code provider's name is incorrect, or the wrong identity image is displayed—the user may take an appropriate action to halt the task. For example, the user could press a special key combination on the keyboard 192 to instruct the supervisor 160 to terminate the secure session. Alternatively, if the information displayed on the screen 123 does match the user's expectations but the indicator 193 is off (which may happen, for example, if the operating system 111 is compromised and an attacker controlling the operating system 111 simulates screen output without relegating control to the secure zone 150), the user may similarly take any appropriate action to halt the task. Thus, in order for the user to be assured he is working in a completely secure environment, both (i) the identity image should be displayed in the designated area of screen 123 and (ii) the indicator 193 should be on.

In certain embodiments, the code provider may decide that the task does not require provision of a fully secure environment to the user, but rather requires access to the full area of the screen 123 (i.e., "full-screen secure mode"). This may be implemented, for example, by setting a boolean flag, indicating whether to use full-screen or partial-screen (i.e., displaying the identity image) mode; to ensure security, supervisor 160 may ensure that indicator 193 is on only in partial-screen secure mode (i.e., when the identity image is displayed) If, at step 230, it is determined that the task should run in full-screen secure mode, the supervisor 160 may grant the secure processor 162 access to the whole screen 123 and proceed to step 245. Full-screen mode might be useful, for example, if the user simply wishes to decrypt and display protected media content he already possesses—the secure zone 150 provides useful technical capabilities (such as the crypto engine 121 and decoder 122)—but does not require the fully secure environment that he might use in situations such as secure communications.

At step 245, the supervisor 160 may load the received code into the instruction memory 164, may store any received application data into the data memory 165, and may instruct the secure processor 162 to begin executing the received code.

At step 250, the supervisor 160 may begin waiting for one or more events related to code execution. For example, at transition 252, code running on the secure processor 162 may request the supervisor 160 to switch into full-screen secure mode and obtain access to the whole screen 123 (i.e., without having the "identity image" being shown). In such a case, as described above, at step 254, the supervisor 160 may turn off the indicator 193 to demonstrate that supervisor 160 no longer controls the output to the screen 123 (and therefore that a designated portion of the screen cannot be used to identify the code provider). The supervisor 160 also may instruct the mixer 181 to show only information from the decoder 122 on the screen 123, effectively granting the whole screen 123 to the code running on the secure processor 162.

At transition 255, code running on the secure processor 162 may request the supervisor 160 to switch back into a partial-screen secure mode and redisplay the identity image of the task provider. This may happen, for instance, if a user wished to confirm that the code of the same provider is still running. In this case, at step 256, the supervisor 160 may instruct the mixer 181 to show information from the decoder 122 only on the designated portion of screen 123, while on the other portion the supervisor 160 will begin redisplaying the identity image. The supervisor 160 also may turn on the indicator 193 to assure the user that the displayed is a legitimate identity image.

If, at transition 257, the code execution has finished, the code running on the secure processor 162 may send a notification back to the supervisor 160 notifying it that code execution has finished, and the supervisor 160 may perform certain steps to transition control back to the non-secure zone 152.

In some embodiments it may happen that, as shown at transition 260, code running on the secure processor 162 terminates abnormally (for example, via a secure processor 162 exception).

In this case, at step 270, the supervisor 160 may display a notification message to the user indicating that a secure task has been abnormally terminated and that the system is about to switch to non-secure mode of operation. The method may wait at step 270 until the user confirms that she has viewed this notification message (for example, by pressing a button on the keyboard). This confirmation may be desirable because, otherwise, the user may have the erroneous perception that the secure task is still running after it has actually abnormally terminated. In some embodiments, this notification message may be shown only if the task has changed its state from partial-screen mode to full-screen mode at least once during task execution time.

At step 275, the supervisor 160 may begin a "cleanup" routine and clear all the instruction and data memories 164 and 165 (for example, by zeroing them). At step 280, the supervisor 160 may shut off the indicator 193. Finally, at step 285, the supervisor 160 may transfer control of any I/O devices back to the non-secure zone 152; for example, it might instruct the keyboard switch 194 to process keyboard 192 input through the operating system 111 of the computing device 120, as well as to instruct the mixer 181 to display information which comes from the operating system 111, on screen 123.

Figure 3:
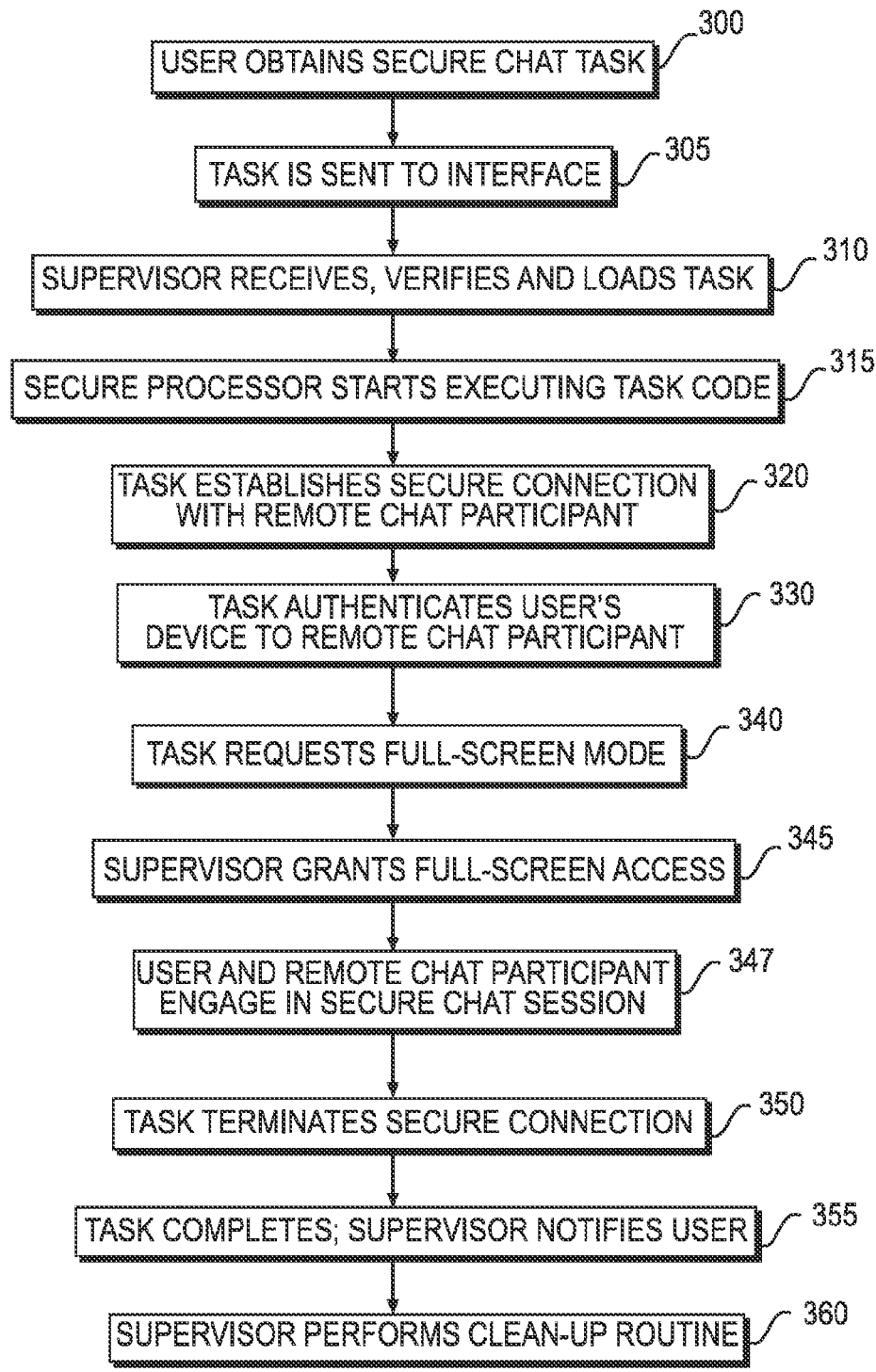
FIG. 3 is a flow diagram illustrating an exemplary method by which a secure chat may be established according to the present disclosure.

FIG. 3 illustrates how the systems, methods and apparatuses according to the present disclosure may be used to execute a secure chat program.

At step 300, the user may download code, intended for execution on the secure zone 150, and configured to establish a secure communication and data exchange with a remote individual. In other embodiments, this code may have already been downloaded to the user's computing device 120.

At step 305, the code may be sent via the interface 151 to the secure zone 150. The task may be sent to the interface 151 by, for example, the operating system 111 or one or more applications 112 running on the operating system 111.

At step 310, the supervisor 160 may receive the task, verify its integrity and load its code into the instruction memory 164 (and any corresponding application data to data memory 165) (e.g., in accordance with steps 205-245 discussed with respect to FIG. 2). As described above, the supervisor 160 may display on the screen 123 an image of a digital certificate associated with the task, which may give the user the opportunity to ensure that the task has come from the expected source (for instance, from a company known to develop chat clients).

The task code having been loaded for execution, at step 315, supervisor 160 may instruct the secure processor 162 to start executing the code, resulting at step 320 in a secure connection between the secure zone 150 and the remote chat participant's secure zone 150.

In one embodiment, the user and the other person may have a "common secret", such as a password each individual knows, which may be used for mutual authentication and the establishment of the secure channel at step 320. In such an embodiment, the task code running on the secure processor 162 may prompt the user to enter the common secret using keyboard 192 (it being understood that the secure zone 150 currently has control over the keyboard 192). As the remote user will also be prompted to enter the common secret, which can then be verified against the version entered by the user using keyboard 192, the successful establishment of a secure channel will imply that the connection was established with the proper remote individual. For example, such a secure channel can be established using any known or future-developed password-authenticated key agreements, including such methods as password-authenticated key agreement (PAK), password-protected key (PPK), Encrypted Key Exchange (EKE), simple password exponential key exchange (SPEKE), or password-authenticated key exchange by juggling (J-PAKE).

In another embodiment, rather than relying on a "common secret", both users may have digital certificates issued by a trusted third party. These certificates may be used for establishing a secure channel and mutual SSL authentication. To increase security the user may keep his/her private key and certificate encrypted on a separate flash drive, which, when needed, may be connected to a USB drive (not shown) which, in turn, may be connected to the secure processor 162. When the task code is about to establish the secure connection, it may prompt the user to insert a flash drive (storing an encrypted version of his digital certificate) into the USB drive, and to use the keyboard 192 to enter the password required to decrypt the private key. If the connection is established, each party may see the ID contained in the certificate of the other party, and thus may verify that she is in contact with the intended party.

In some embodiments, at optional step 330, chat participants may want to verify that the connection is established between specific devices (for example, the chat participants may have pre-agreed to use only certain laptop computers they own to chat).

For this purpose, any kind of mutual authentication (for example, some variation of challenge-response authentication, including, for example, FIPS PUB 196), based on one of the public/private key pairs stored in key storage 167, may be used. In some embodiments, instead of pre-exchanging public keys of laptop computers, chat participants may want to verify that the connection is established with any trusted device (but not, for example, with a non-trusted operating system, such as the operating system 111). In such embodiments, the task running on the secure processor 162 may, in addition to authenticating the public key of the secure zone 150 of the remote chat participant, send a request to a trusted third party to ensure that this public key belongs to a trusted device (wherein such a third party may maintain the list of all IDs and/or public keys of all trusted devices).

Optionally, at step 340, the task may request the supervisor 160 to enter full screen mode. This may happen, for instance, because the user wants to use the whole screen for the purpose of chatting. At step 345 (as described in steps 252-254 with respect to FIG. 2), the supervisor 160 may grant such access to the task, and the indicator light 193 may be shut off.

At step 347, the user may exchange one or more secure text messages (i.e., chat) with a remote chat participant.

Finally, the task may be complete, such as because either the user or the remote chat participant elected to stop chatting. In this case, at step 350, the task may close the secure channel of communication, and, at step 355, the task may send a notification regarding termination to the supervisor 160. If it was the remote chat participant who initiated the termination of the chat session, the task running on the secure processor 162 may show a notification message to the user (on screen 123) before the task terminates, and wait until the user confirms that she has seen this notification message (for example, by pressing a button on keyboard 194). Such a notification message may be necessary to ensure that user is aware that the secure mode of operation is about to be terminated.

The supervisor 160 may then perform, at step 360, a cleanup routine such as that, for example, described with respect to steps 257-285 or 260-285 above.

Figure 4:
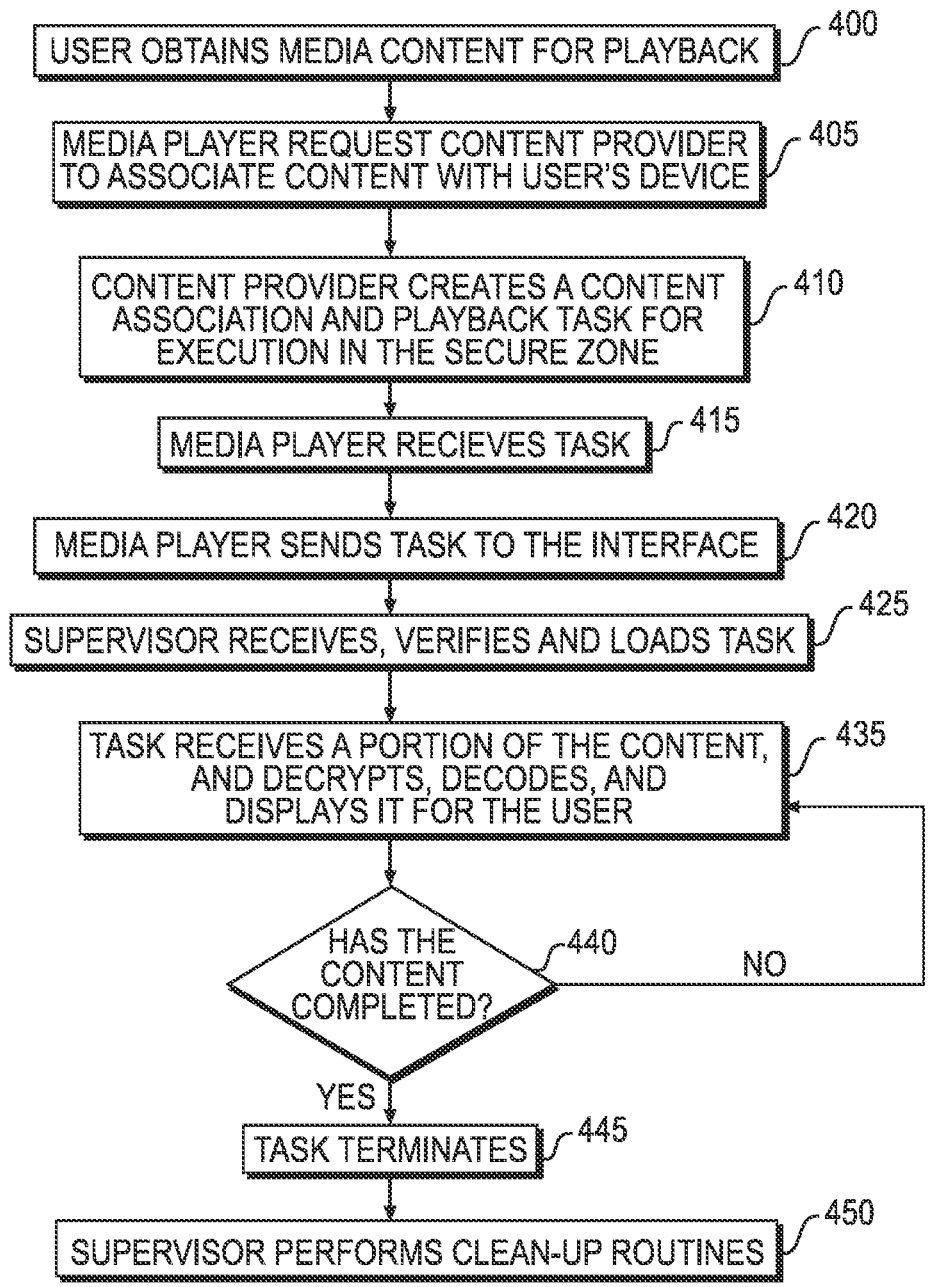
FIG. 4 is a flow diagram illustrating an exemplary method by which protected media content may be distributed according to the present disclosure.

FIG. 4 illustrates how the systems, methods and apparatuses according to the present disclosure may be used to securely display protected media content such as, for example, in accordance with the methods described in U.S. Provisional Patent Application No. 61/605,684, titled "Systems, Methods and Apparatuses for the Secure Transmission of Media Content," and filed on Mar. 1, 2012. As described more fully in the '684 application, media content may be encrypted from the time it leaves a media content provider up until the time it is finally decoded and converted to an analog signal for playback. A secure zone 150, as described herein, could be incorporated within a computer or a television set to ensure that the final processes of decryption, decoding and conversion to an analog signal remain in secure hardware.

At step 400, the user may launch a media player application 111 on his computing device 120 and download (or select already-downloaded) protected media content for playback. At step 405, the media player application may determine that the media content is encrypted, and may connect to a web server of the media content provider in order to associate the media content with the user's computing device 120. To acquire such an association, the media player application may need access to a URL of the content provider's web server, a user ID (representative of the user requesting the association), a content ID (representative of the media content) and a device ID (representative of the user's computing device 120).

In some embodiments, the URL and the media content ID may have been stored within the file containing the encrypted media content. The user ID may have been stored within the media player application 112, or may be entered by the user via the keyboard 192. As described previously, the device ID may have been stored in the key storage 167 of the secure zone 150; in such a case, the media player 112 may need to request access to the device ID through the interface 151. Such a request may be implemented in the media player 112 as a call to the operating system 111, which in turn may pass the request to the interface 151, wait for the response, and return the response back to the media player 112. This acquired device ID may be stored within the media player application 112 for future use.

At step 410, the media content provider may encrypt and sign a "playback" task, which may include the code and data necessary to decrypt and playback the protected media content. For example, the task might include one or more symmetric keys which may be used to decrypt the media content; the task (including the symmetric keys) may have been encrypted with a public key corresponding to a private key previously stored within key storage 167. In addition, the media content provider may set the flag requesting full screen access (indicating that the task does not require providing a secure environment to the user), since the user may prefer to use the entire screen 123 for the display of media content rather than continuously viewing the identity image from the media content provider's digital certificate on a portion of the screen 123.

At step 415, the media player application 112 may receive from the content provider the encrypted and signed playback task.

At step 420, the media player application 111 may send the received task to the interface 151. This may be performed, for example, by a call to the operating system 111, which in turn will pass information to interface 151.

At step 425, the supervisor 160 may receive the task, verify its integrity and load its code into the instruction memory 164 and its data into data memory 165 (e.g., in accordance with steps 205-245, discussed previously with respect to FIG. 2). This may include determining whether the code requires full screen or partial screen mode and setting the indicator 193 accordingly.

At step 435, the task may receive all or a portion of the encrypted media content, decrypt it using a symmetric key found within the data segment of the task, and pass it to the decoder 122 for decoding and display on the screen 123. This may continue until, for example, all of the media content has been played back, or until the user elects to stop viewing the media content.

If, at step 440, there is no more content to be displayed, at step 445 the task may send a notification of termination to the supervisor 160. At step 450, the supervisor 160 may perform cleanup routines, e.g., as described in steps 257-285 or 260-285 with respect to FIG. 2, above.

As yet another example, the systems, methods and apparatuses of the present disclosure may be used to protect against the unauthorized duplication of application software. For example, existing software is available to compress files such as, for example, WinZip, 7-Zip, etc. A developer of a new file compression program, based on an entirely new compression algorithm, may wish to prevent individuals from duplicating and/or distributing his new software, either to their friends or commercially.

In some embodiments, the software might be copy-protected by use of a password. The operating system 111, upon starting the software, might send a message to the secure zone 150 requiring it to execute a task configured to securely verify the authorized user's password. The secure zone 150 might then authenticate the user and return a signal to the operating system 111 indicating, as a boolean value, whether the user entered the correct password (e.g., "true" if the user entered the correct password and "false" if the user entered the incorrect password). If the user was authenticated properly, the operating system 111 could then permit duplication of the application software.

However, it will be understood that, in the foregoing example, it would be possible for a malicious user to intercept the authentication request sent by the operating system 111 (and intended for the secure zone 150), and then to pretend to be the secure zone 150 by sending his or her own "true" signal back to the operating system 111.

Thus, in a different embodiment, the file compression software could be logically divided into two components: a user interface (UI) and the underlying compression algorithm. In this case, the underlying compression algorithm code could be configured as a "task" for the purposes of the present disclosure. The task might then be encrypted with a public key, corresponding to a private key stored in the key storage 167 (of secure zone 150). In this manner, the user's operating system 111 could execute all of the UI code (i.e., in the non-secure zone 152), but the fundamental task of the software—the compression—could only be performed within the secure zone 150, requiring access to the specific user's private key. As a result, if the individual (user A) were to give or sell the software to another individual (user B), user B might be able to display the UI on her computer (because that runs in the non-secure zone 152), but she would not be able to actually produce a compressed file (because the compression code would require access to user A's private key).

It will be understood that the foregoing example of file compression software is not the only type of software which could be protected according to systems, methods and apparatuses disclosed herein, and that many other types of software applications might be protected such as, for example, video games. Regardless of the specific software protected, it may be preferable to ensure that whatever task is segmented out of the protected software for performance in the secure zone 150 is essential to the nature of the protected software—i.e., in the previous example, the fundamental purpose of compression software (to compress a file) was protected by the user's private key.

Yet another exemplary embodiment according to the present disclosure is an implementation of "bot" prevention features for certain online games. "Bots," or automated players, are a known problem for multiplayer games, such as MMORPGs. If a secure zone 150 is used to control the operation of an online game, the operating system 111 running in the non-secure zone 152 will not have access to the information within the secure zone 150, and whatever information is passed from the secure zone 150 to the screen 123 cannot be seen by the operating system 111. As a very simple example, the loaded code can be used to display a "captcha," which cannot be seen by the operating system 111.

In a more complicated example, a "non-secure" part of game information could be rendered by the non-secure operating system 111 and displayed on the screen 123. For example, this "non-secure" information might be a 3D image of a scene generated by the game, which may be running as an application 112 under the operating system 111. Then, a "secure" part of gaming information, such as the current state of one or more game parameters essential for a user to actually play the game (for example, "gamer health," "available resources," "present location," "car speed," etc.—which are frequently shown as 2D images overlaid on a 3D scene) may be passed from the remote server hosting the game over a secure channel to a task running within the player's secure zone 150. This "secure"

part of gaming information may passed via the operating system 111 (in an encrypted format) on the way to the secure zone 150, but is not accessible to the operating system 111 or to any applications 112 due to encryption.

Upon receipt of the "secure" part of gaming information, the task running on the secure processor 162 may decrypt the information, render it if necessary (using, for example, the decoder 122), and instruct the mixer 181 to overlay this "secure" rendered information (which can be rendered as a semitransparent image) over the "non-secure" gaming information passed from the game application 112.

Another embodiment according to the present disclosure may be used for the secure publishing of information on social network sites. For example, users often want to publish something sensitive, which is intended only for viewing by close friends. Currently, such information is typically protected with a password, which can be easily stolen—causing significant problems to the user who publishes that information. According to the present disclosure, a user may publish information encrypted by a symmetric key. The symmetric key may be distributed to all of the user's friends having been encrypted with public keys, which correspond to private keys of their respective computers (such private keys may be stored, for example, in the key storage 167 of a secure zone 150 within their computers). When recipients want to view the information, they may load a task (similar to the task discussed with respect to FIG. 4) which may perform the process of decrypting and displaying the user's encrypted information. In this manner, the security of such information is substantially increased.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
a screen;
a non-secure zone;
a secure zone comprising:
   a memory inaccessible to the non-secure zone;
   a non-volatile storage configured to store at least one digital certificate and at least one encryption key, the at least one digital certificate comprising information representing a task signer;
   a secure processor configured to execute a task associated with the at least one digital certificate; and
   a supervisor configured to:
      control access to the at least one digital certificate and the at least one encryption key;
      assume control over an output of the screen when the apparatus operates in a secure mode, wherein the secure mode may be a partial screen secure mode or a full screen secure mode;
      control execution of the task by the secure processor;
   an indicator operatively controlled by the supervisor;
   wherein the supervisor is configured when the apparatus operates in the partial screen secure mode to:
      delegate control of a first portion of the screen to the task executing on the secure processor;
      display in a second portion of the screen the information representing the task signer from the at least one of the digital certificate; and
      activate the indicator;
   wherein the supervisor is configured when the apparatus operates in a full screen secure mode to:
      delegate control of the entire screen to the task executing on the secure processor;
      deactivate the indicator; and
   wherein the supervisor is configured when the apparatus operates in a non-secure mode to transfer control over the output of the screen to the non-secure zone.

2. The apparatus of claim 1, wherein the supervisor is further configured when the apparatus operates in the non-secure mode to deactivate the indicator.

3. The apparatus of claim 1, further comprising an interface between the non-secure zone and the secure zone, wherein the secure zone receives the task from the non-secure zone through the interface.

4. The apparatus of claim 1, wherein the non-secure zone is configured to execute an operating system and at least one application in a non-secure mode.

5. The apparatus of claim 1, further comprising an input device, and a switch connected to the input device, wherein the switch is configured to direct input received through the input device to the secure zone in the secure mode and to the non-secure zone in the non-secure mode.

6. That apparatus of claim 1, wherein the secure zone is further comprised of a decoder and an image processor, and the apparatus further comprising a mixer, wherein the mixer is configured to receive input from one or more of the decoder, the image processor and the non-secure zone, and wherein the mixer is configured to provide the output to the screen.

7. The apparatus of claim 6, wherein the mixer is configured to receive the information representing the task signer from the image processor and information from the decoder, and wherein the mixer is further configured to provide to the screen an output comprising in part the information representing the task signer.

8. The apparatus of claim 6, wherein the mixer is configured to exclude input received from the non-secure zone from the output to the screen when the apparatus operates in the secure mode.

9. The apparatus of claim 1, wherein the non-volatile storage comprises a first non-volatile storage configured to store the at least one digital certificate and a second non-volatile storage configured to store the at least one encryption key.

10. The apparatus of claim 1, wherein the task comprises executable code and the supervisor is further configured to:
receive the task in the secure zone;
decrypt the task if it is encrypted;
validate a digital signature associated with the task if the task is digitally signed; and
load the executable code of the task into the memory and permit the secure processor to execute the executable code.

11. The apparatus of claim 1, wherein the secure zone is tamper protected.

12. A method of operating an apparatus in a secure mode, wherein the apparatus comprises a non-secure zone, a secure zone, and a mixer, and wherein the secure zone comprises a supervisor, a secure processor, a non-volatile storage, a memory inaccessible to the non-secure zone, an image processor and a decoder, the method comprising:
receiving at the secure zone a task from the non-secure zone;
assuming control by the supervisor over an output to a screen;
decrypting by the supervisor the task using an encryption key stored in the non-volatile storage;
validating by the supervisor a digital signature associated with the task using a digital certificate stored in the non-volatile storage;
executing the task by the secure processor utilizing data in the memory inaccessible to the non-secure zone;
receiving input at the mixer from one or more of the decoder, the image processor and the non-secure zone, wherein the input from the image processor comprises information from the digital certificate representing a task signer;
generating an output by the mixer to the screen, wherein the output comprises the information from the digital certificate representing the task signer to be displayed on a designated area of the screen when the task is being executed by the secure processor; and
transferring control over the output of the screen to the non-secure zone after the task execution is complete.

13. The method of claim 12, wherein the secure zone further comprises an interface separating the non-secure zone from the secure zone, and the secure zone receives the task from the non-secure zone through the interface.

14. The method of claim 12, further comprising executing an operating system and at least one application in the non-secure zone.

15. The method of claim 12, further comprising switching input received by a peripheral device to the secure zone when the task is being executed and to the non-secure zone after the task execution is complete.

16. The method of claim 12, further comprising excluding input received from the non-secure zone from the output to the screen when the task is being executed.

17. The method of claim 12, further comprising activating an indicator while the task is being executed by the secure processor.

18. The method of claim 12, wherein the non-volatile storage comprises a first non-volatile storage for storing the encryption key and a second non-volatile storage for storing the digital certificate.

* * * * *